United States Patent [19]
Nowell

[11] 3,764,889
[45] Oct. 9, 1973

[54] SEQUENCER FOR A DUAL SWITCHING REGULATOR

[75] Inventor: John R. Nowell, Phoenix, Ariz.

[73] Assignee: Honeywell Information Systems Inc., Waltham, Mass.

[22] Filed: Aug. 23, 1972

[21] Appl. No.: 283,240

[52] U.S. Cl.............. 323/17, 307/252 K, 321/2, 323/DIG. 1
[51] Int. Cl........................ H02m 1/08, H02m 3/32
[58] Field of Search.............. 307/252 J, 252 K, 307/252 L; 321/2, 11, 18; 323/17, 22 SC, DIG. 1

[56] References Cited
UNITED STATES PATENTS
3,656,052  4/1972  Genuit et al.................. 323/DIG. 1
3,697,853  10/1972 Nowell et al............................. 321/2
3,526,823  9/1970  Genuit..................................... 321/2
3,679,964  7/1972  Nowell................................... 321/11

Primary Examiner—A. D. Pellinen
Attorney—Lloyd B. Guernsey et al.

[57] ABSTRACT

The sequencer employs an oscillator, a disable circuit, a timer and a pair of master-slave flip-flops to provide pulses for operating a dual switching regulator. The disable circuit and timer prevent the generation of pulses while a portion of the switching regulator is delivering current to an output terminal and thereby prevent possible damage to the switching regulator.

8 Claims, 4 Drawing Figures

SEQUENCER FOR A DUAL SWITCHING REGULATOR

CROSS-REFERENCE TO RELATED APPLICATIONS

A detailed description of the operation of the error amplifier can be found in the U.S. Pat. application Ser. No. 200,675 by John R. Nowell, filed Nov. 22, 1971, now U.S. Pat. No. 3,707,684 entitled "Error Amplifier for Use with a Switching Regulator." A more detailed description of the operation of the switching regulator can be found in the U.S. Pat. No. 3,573,597, by Luther L. Genuit and John R. Nowell, issued Apr. 6, 1971, entitled "High Current Switching Regulator with Overlapping Current Output Pulses."

BACKGROUND OF THE INVENTION

This invention relates to a sequencer for a dual switching regulator and more particularly to a sequencer which uses an oscillator, a disable circuit, a timer and a pair of master-slave flip-flops to provide pulses for operating a dual switching regulator. The disable circuit and the timer prevent the generation of pulses while a portion of the switching regulator is delivering current to an output terminal and thus prevents possible damage to portions of the switching regulator. The timer may be omitted from the sequencer when the dual switching regulator is not required to deliver large amounts of output current.

In high speed data processing systems switching regulators may be used to provide D.C. power to electronic circuits in the system. These regulators are smaller and more efficient than prior art power supplies so that the regulators may be located in the cabinets which contain the circuits rather than in a separate cabinet as required when prior art power supplies are used. Location of regulators near the circuits greatly reducing the length of cables which distributes the current to the circuits and reduces the amount of error signals which may be caused by variations in voltage in long cables.

The switching regulator may employ a pair of transformers, a pair of silicon controlled rectifiers and a source of signals to convert an unregulated D.C. voltage, such as 150 volts, to an accurately regulated voltage such as one volt. The silicon controlled rectifiers are employed as switches between the source of unregulated D.C. voltage and the transformers. The silicon controlled rectifiers are located on the "high" voltage side of the transformer where the current and power losses in these rectifiers are low, thereby causing the switching regulator to have a high degree of efficiency. The regulated D.C. voltage obtained from the secondary windings on the transformers is supplied to a pair of voltage output terminals. The transformers provide isolation between the regulated D.C. voltage and the source of unregulated D.C. voltage so that a short circuit in the silicon controlled rectifier will not cause damage to the micro-circuit modules which provide the load on the switching regulator.

The silicon controlled rectifier is a semiconductor device having an anode, a cathode and a gate. The silicon controlled rectifier can be used as an ON-OFF switch which can be turned on in a very few microseconds. Normally, the silicon controlled rectifier cannot conduct current between anode and cathode thereof until a pulse of current larger than a threshold value flows from gate to cathode. If a positive voltage difference exists between the anode and cathode when a pulse of current flows into the gate, the silicon controlled rectifier "fires;" i.e., is rendered conductive and a current will flow from the anode to the cathode. The rate at which the current flow from anode to cathode increases when the silicon controlled rectifier fires must be limited to prevent damage to the rectifier. Once anode-cathode flow commences, the gate has no further control over such current flow. Current flow from anode to cathode in a rectifier can be terminated only by reducing the anode to cathode current below a "holding" or minimum current value. A more detailed description of the operation of a silicon controlled rectifier can be found in the "Silicon Controlled Rectifier Manual," 4th Edition, 1967, published by the General Electric Company, Syracuse, New York.

A signal source is coupled to the voltage output terminals and develops trigger signals whose frequency is determined by the value of voltage at the voltage output terminal. The trigger signals are coupled to the silicon controlled rectifiers in the switching regulator and cause these rectifiers to deliver energy through the transformers to output filter capacitors which are connected to the voltage output terminal. The signal source senses any change in the value of any regulated output voltage and causes a change of frequency in the trigger signals delivered to the switching regulator.

The signal source includes an error amplifier, a rate generator and a trigger generator. The error amplifier develops a current having a value which is determined by the voltage at the output terminals of the switching regulator. This current is applied to the rate generator which develops pulses having a frequency which is determined by the value of current from the error amplifier. The pulses from the rate generator are applied to the trigger generator which develops trigger signals which are applied to the gates of the silicon controlled rectifiers in the switching regulator.

Rate generators include an oscillator and a circuit which disables the oscillator during the time that all of the secondary windings of the transformers in the switching regulators are delivering current to the output filter capacitors. If the oscillator were to deliver a pulse to the switching regulator while all of the seondary windings are delivering current to the filter capacitors current in one of the silicon controlled rectifiers could increase very rapidly and cause damage to the rectifier. What is needed is a circuit which prevents the oscillator from generating a pulse while the rectifier is conducting.

When the values of current which are required in a portion of a data processing system is greater than can be delivered by a single switching regulator two or more switching regulators may be connected in parallel to provide the required current. In prior art systems each of the switching regulators use a control circuit which includes an error amplifier, a rate generator, and a trigger generator. This causes a power supply to be relatively bulky and expensive. Slight differences in the values of components used in the different control circuits may cause one of the switching regulators to deliver more current than is delivered by the other regulators. This may cause damage to components in the regulator which delivers the larger value of current. What is needed is a circuit where a single error amplifier, a single rate generator and a trigger generator can be used to control the operation of more than one switching regulator. The present invention provides a sequencer which employs a single oscillator, a disable circuit, a timer and a trigger generator to provide pulses for operating a dual switching regulator which delivers as much output current as two of the prior art switching regulators.

It is, therefore, an object of this invention to provide a dual switching regulator having a single control circuit.

Another object of this invention is to provide a dual switching regulator having a sequencer which causes a plurality of silicon controlled rectifiers to sequentially deliver energy through transformers to a voltage output terminal.

A further object of this invention is to provide a sequencer having a timer which inhibits the generation of pulses while any of the silicon controlled rectifiers in the regulators are conducting.

Still another object of this invention is to provide a sequencer having a circuit which inhibits the generation of pulses while all of the secondary windings of the switching regulator are delivering current to the output terminals, but is ready to produce a pulse as soon as one of the transformer windings stops delivering current.

A still further object of this invention is to provide a sequencer which develops pulses having a frequency which is determined by the value of the voltage at the output terminal of the switching regulators.

Another object of this invention is to provide a sequencer for a dual switching regulator which causes each of the silicon controlled rectifiers in the switching regulator to deliver substantially the same amount of current as each of the other silicon controlled rectifiers in the dual switching regulators.

SUMMARY OF THE INVENTION

The foregoing objects are achieved in the present invention by providing a new and improved sequencer for use with a dual switching regulator. The sequencer includes a recovery disable circuit, an oscillator, a pulse amplifier, a timer and a trigger generator. The oscillator receives an input current and delivers pulses having a frequency which is proportional to the value of the current received. The recovery disable circuits prevent the oscillator from developing pulses while all of the transformers in the dual switching regulator are delivering current to the output terminals. The timer prevents the oscillator from developing pulses while any one of the silicon controlled rectifiers in the dual switching regulator is conducting.

Other objects and advantages of this invention will become apparent from the following description when taken in connection with the accompanying drawings.

DESCRIPTION OF THE PROPOSED EMBODIMENT

Figure 1:
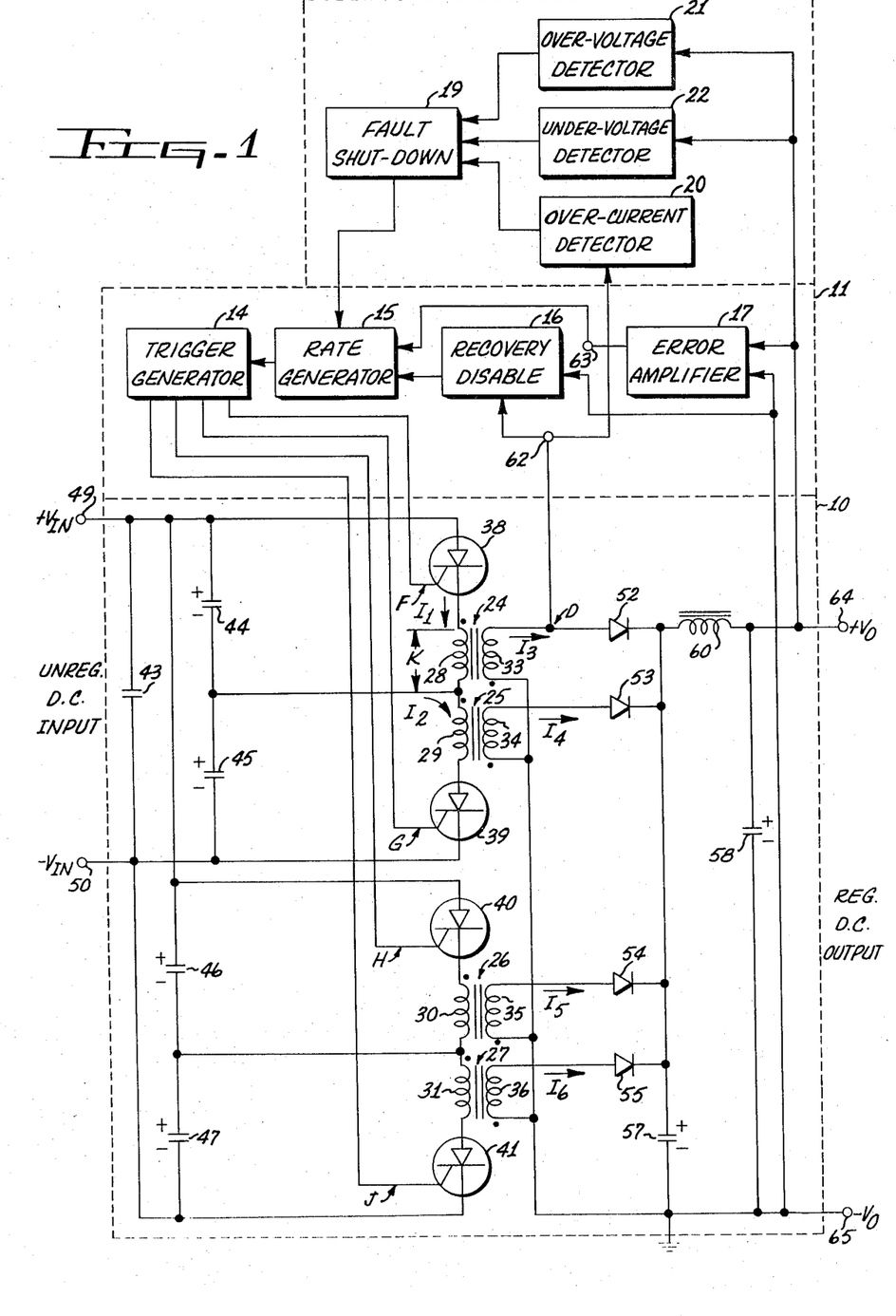
FIG. 1 is a schematic drawing of a dual switching regulator and its associated control circuits including the present invention.

Referring more particularly to the drawings by the characters of reference, FIG. 1 discloses a power supply system which is designed to provide a constant supply of D.C. output voltage for a wide range of values of output current and for monitoring the current delivered to a load which may be connected to the system. As indicated in FIG. 1, the system comprises a dual switching regulator 10, a switching regulator control circuit 11 for providing trigger signals to switching regulator 10, and a circuit 12 for monitoring the current and voltage delivered by the power supply. The switching regulator control circuit 11 comprises a counter and trigger generator 14, a rate generator 15, a recovery disable circuit 16 and an error amplifier 17. The error amplifier 17 detects any change in the voltage at the output terminals of the switching regulator and provides a current whose value is determined by the change in the output voltage. The current from the error amplifier 17 causes the rate generator 15 to develop pulses having a frequency which is determined by the value of the current from the amplifier 17. Pulses from the rate generator cause the trigger generator 14 to develop trigger signals for the switching regulator. The recovery disable circuit 16 senses the time that output current is being delivered by one of the portions of the switching regulator to the output filter capacitors and prevents the rate generator from delivering pulses during the time that this current is being delivered.

The overcurrent detector 20, the overvoltage detector 21 and the undervoltage detector 22 sense any abnormal values of current or voltage at the output terminals of the switching regulator and provide signals to the fault shutdown circuit 19. When the fault shutdown circuit 19 receives a signal from any of the detectors 20, 21 and 22 it provides a signal to the rate generator which disables the rate generator and prevents any pulses from being supplied to trigger the switching regulator.

SWITCHING REGULATOR

As indicated in FIG. 1, the dual switching regulator 10 includes a pair of switching regulators, each of the pair of regulators having a pair of transformers. The first of the two regulators includes a pair of transformers 24 and 25, each having a primary winding and a second winding. The primary windings 28 and 29 are connected in series and are coupled to the high voltage unregulated D.C. power supply which is connected to the input terminals 49 and 50. A pair of silicon controlled rectifiers 38 and 39 control the current supplied by the unregulated D.C. power supply to the primary windings of transformers 24 and 25. The anode of silicon controlled rectifier 38 is connected to the positive terminal 49 of the unregulated D.C. power supply and the cathode of silicon controlled rectifier 38 is connected to the upper end of primary winding 28. The gate of silicon controlled rectifier 38 is connected to one lead of the trigger generator 14 which provides trigger signals to render rectifier 38 conductive. The anode of silicon controlled rectifier 39 is connected to the lower end of primary winding 29 and the cathode of silicon controlled rectifier 39 is connected to the negative terminal 50 of the unregulated D.C. power supply. A second lead from the trigger generator 14 is connected to the gate of silicon controlled rectifier 39 to provide trigger signals to render rectifier 39 conductive. The other half of the dual regulator includes transformers 26 and 27 and silicon controlled rectifiers 40 and 41.

Figures 2, 3:
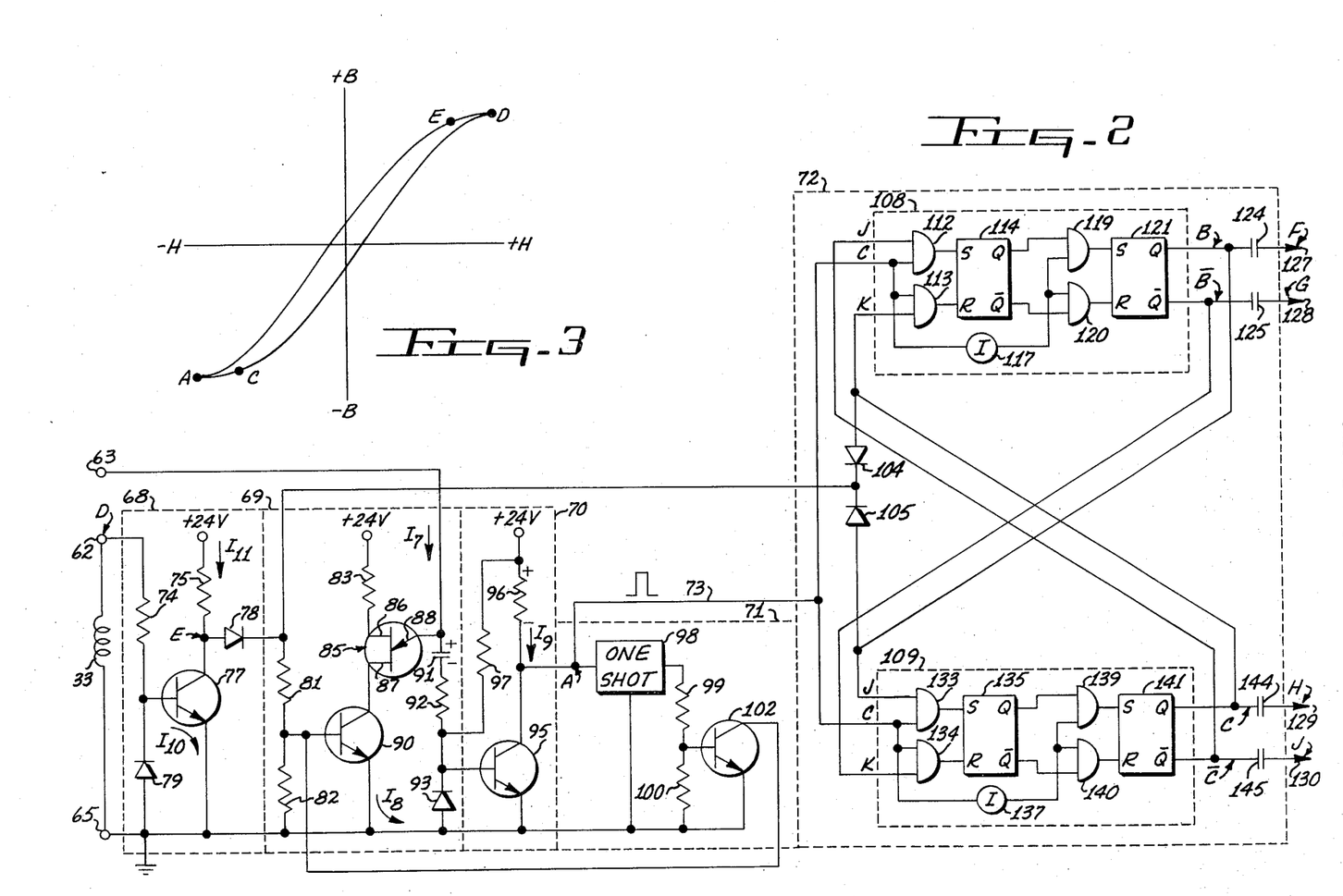
FIG. 2 is a schematic drawing of an embodiment of the present invention.
FIG. 3 illustrates a magnetization curve which is useful in explaining the operation of the circuit shown in FIG. 1.

The magnetic core employed in transformers 24–27 provides the magnetization characteristics illustrated in the magnetization curve of FIG. 3. The magnetizing force H is equal to the product of the number of turns in a winding on the transformer core and the number of amperes of current for each turn of wire divided by the length of the core. Since the physical length of a particular transformer core is constant the magnetizing force of the transformer is often expressed as the number of amperes times the number of turns, or "ampere-turns." The flux density B is a number of lines of flux per square centimeter of the transformer core and the type of material used in the core. A discussion of the magnetization curves can be found in the textbook "Magnetic Circuits and Transformers" by E.E. Staff, M.I.T., 1943, published by John Wiley & Sons, New York, N.Y.

Figure 4:
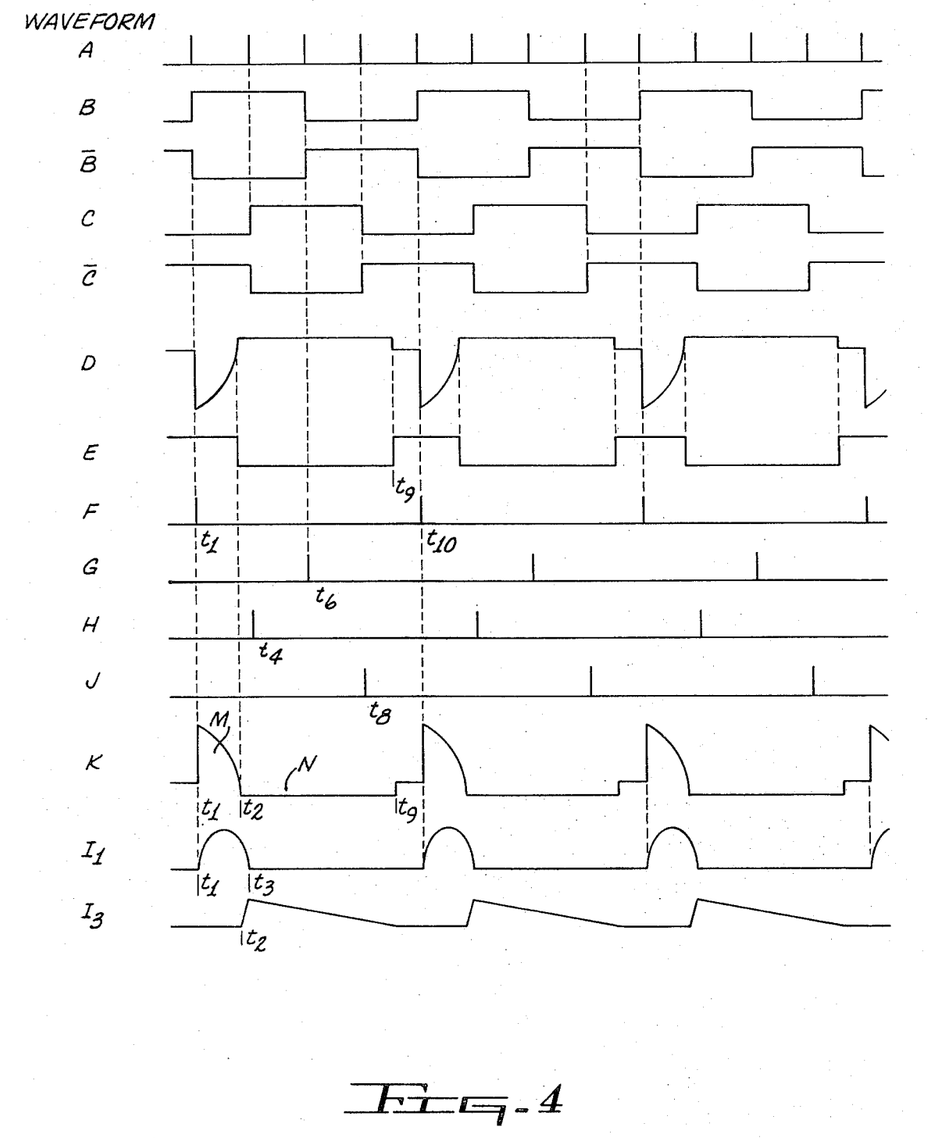
FIG. 4 illustrates waveforms which are useful in explaining the operation of the present invention.

The operation of one half of the dual switching regulator of FIG. 1 will now be discussed in connection with the magnetization curve shown in FIG. 3 and the waveforms shown in FIG. 4. It should be understood that the other half of the dual switching regulator operates in a similar manner.

A pair of capacitors 44 and 45 provide predetermined quantities of electrical energy to the transformers 24 and 25 each time one of the silicon controlled rectifiers 38 and 39 is rendered conductive. Each time one of the silicon controlled rectifiers 38 and 39 is rendered nonconductive the same predetermined quantity of energy is delivered by one of the transformers 24 and 25 through diodes 52 and 53 to a filter capacitor 57. Prior to the time $t_1$ shown in FIG. 4, capacitor 44 of FIG. 1 is charged to the polarity shown in FIG. 1. At time $t_1$ a pulse from trigger generator 14 renders silicon controlled rectifier 38 conductive so that the voltage across capacitor 44 is supplied to the primary winding 28 of transformer 24 causing a current $I_1$ to flow from the upper plate of capacitor 44 through anode to cathode of rectifier 38, through the primary winding 28 to the lower plate of capacitor 44.

The current $I_1$ through primary winding 28 causes a change of flux in the transformer core and causes the operating point to move from point A toward point C of the magnetization curve in FIG. 3. This change in flux produces a voltage across primary winding 28, which limits the rate of increase in current through silicon rectifier 38, thus preventing possible damage to rectifier 38. A positive voltage applied to the upper end of primary winding 28 causes the operating point to move from point C to point D. The distance between point C and point D is proportional to the product of the voltage applied to primary sinding 28 and the duration of time this voltage is applied.

The voltage applied to primary winding 28 is magnetically coupled through the transformer core to the secondary winding 33. Between time $t_1$ and time $t_2$ secondary winding 33 has a positive polarity of voltage at the lower end of the winding and a negative polarity of voltage at the upper end of the winding. At this time, the voltage across the secondary winding 33 causes diode 52 to be back biased so that no current flows through the diode or through the secondary winding 33. Capacitor 44 provides current $I_1$ until this capacitor has discharged at time $t_3$ as shown in the waveform $I_1$ of FIG. 4. The area M under the curve of waveform K (FIG. 4) between time $t_1$ and time $t_2$ is the sum of the products of the voltage applied to primary winding 28 and the duration of time the voltage is applied and this area M represents the total energy stored in the core of transformer 24. When the voltage applied to primary winding 28 has a zero value at time $t_2$ the operating point reaches point D.

At time $t_2$, the energy stored in the core of transformer 24 reverses the polarity of voltage across each of the transformer windings so that a negative polarity of voltage is developed at the upper end of primary winding 28. This negative polarity of voltage at the upper end of primary winding 28 causes the operating point in FIG. 3 to move from point D toward point E and to begin moving toward point A. Again the distance between point E and point A is proportional to the products of the voltage across primary winding 28 and the duration of time this voltage is applied. The area N under the curve of waveform K between times $t_2$ and $t_9$ is the sum of the products of the voltage across primary 28 and the time this voltage is applied. This area N represents a total energy which the core of transformer point 24 returns through the transformer. The voltage across primary winding 28 causes current $I_1$ to charge capacitor 44 to a polarity opposite to the polarity shown in FIG. 1.

The energy in the core of transformer 24 causes the voltage across secondary winding 33 to increase to a value larger than the voltage across filter capacitor 57 so that a current $I_3$ flows through diode 52 to charge capacitor 57. The energy which is stored in the core of transformer 24 when silicon controlled rectifier 38 conducts is proportional to the difference between the flux at point A and point D on the magnetization curve of FIG. 3; and the energy which is transferred to the secondary winding 33 when silicon controlled rectifier 38 is rendered nonconductive, is proportional to the difference between the flux at point D and point A. Since the distance between point A through point C to point D shown in FIG. 3 is substantially the same as the distance between point D through point E to point A substantially all the energy which was stored in the core of the transformer between times $t_1$ and $t_2$ is returned and stored on capacitors 57 and 58. Capacitor 44 delivers substantially the same amount of energy to the transformer each time the silicon controlled rectifier 38 is rendered conductive so that the amount of energy delivered to capacitors 57 and the voltage across these capacitors is determined by the frequency of signals applied to the gate of rectifier 38. Capacitor 45 also provides a predetermined quantity of energy to transformer 25 each time silicon controlled rectifier 39 is rendered conductive. Capacitors 46 and 47 provide predetermined quantities of energy to transformers 26 and 27 each time that the silicon controlled rectifiers 40 and 41 respectively are rendered conductive.

Prior to time $t_6$, capacitor 45 is charged to the polarity shown in FIG. 1. At time $t_6$ a pulse from the trigger generator 14 renders silicon controlled rectifier 39 conductive so that current $I_2$ flows from the upper plate of capacitor 45 through the primary winding 29, from anode to cathode of rectifier 39 to the lower plate of capacitor 45. Current $I_2$ through the primary winding and the voltage impressed across this winding cause the operating point of the characteristic curve in FIG. 3 to move from point A through point C to point D and cause a predetermined quantity of energy to be stored in the core of transformer 25. When silicon controlled rectifier 39 is rendered nonconductive, this energy is transferred through the secondary winding 34 causing a current $I_4$ to charge capacitor 57 as described above.

The amount of voltage across capacitors 57 and 58 can be controlled by controlling the frequency of the trigger signals which trigger generator 14 applies to the gates of the silicon controlled rectifiers 38–41. The frequency of the trigger signals is determined by the value of the current applied to the rate generator 15. When an increase in the amount of current drawn by a load (not shown) connected across the output terminals 64 and 65 in FIG. 1 causes the value of the output voltage to fall below a predetermined reference level, the frequency of the signals from trigger generator 14 increases. This increase in the frequency of the output signals causes an increase in the rate of energy delivered to capacitors 57 and 58 and increases the voltage between output terminal 64 and 65 to the predetermined reference level. The voltage at the output terminal 64 of the power supply controls the frequency of the signals from trigger generator 14 so that the voltage at the output terminals 64 and 65 is substantially constant even when the current drawn from this power supply varies over a wide range of values.

SEQUENCER

As indicated in FIG. 2, the sequencer comprises a recovery disable circuit 68, a rate generator which includes an oscillator 69 and a pulse amplifier 70, a timer 71 and a counter and trigger generator 72. The oscillator 69 generates a series of pulses having a frequency which is determined by the value of current supplied from the error amplifier to the signal input terminal 63. These pulses are amplified by the pulse amplifier 70 and applied to the counter and trigger generator 72. The pulses cause the counter and rate generator 72 to sequentially provide trigger pulses to output leads 127–130 as shown in waveforms F–J of FIG. 4. These trigger pulses are coupled to the gates of silicon controlled rectifiers 38–41 of FIG. 1.

The oscillator 69 includes a unijunction transistor 85, a transistor 90 and a timing capacitor 91. A unijunction is a semiconductor device having a first base or "base-one," a second base or "base-two" and an emitter. If a positive voltage difference exists between base-two and base-one, the unijunction transistor can conduct current between the emitter and base-one only when a voltage greater than a predetermined threshold or "peak point voltage" value exists between the emitter and base-one. When the voltage on the emitter is more than the peak point voltage, current flows from emitter to base-one until the emitter voltage decreases below a second predetermined or "valley" voltage value. A more detailed description of a unijunction transistor can be found in chapter 13 of the Transistor Manual, 7th Edition, 1964, published by the General Electric Company, Syracuse, N.Y.

A positive voltage such as +24 volts is coupled through resistor 83 to base-two of the unijunction transistor 85. Base-one is connected to the collector of transistor 90. A current from the error amplifier is applied to signal-input terminal 63. The current from the error amplifier causes a current $I_7$ to flow from terminal 63 to the upper plate of capacitor 91, from the lower plate of capacitor 91 through resistor 92, from base to emitter of transistor 95 in the pulse amplifier. Current $I_7$ produces a charge of the polarity shown on capacitor 91. Current $I_7$ from base to emitter of transistor 95 renders transistor 95 conductive so that a current $I_9$ flows from the +24 volt potential through resistor 96, from collector to emitter of transistor 95. Current $I_9$ through resistor 96 provides a voltage drop of the polarity shown in FIG. 2. The voltage drop across resistor 96 subtracts from the +24 volts so that the voltage at the collector of transistor 95 is near ground potential. A current also flows from the +24 volt source through resistor 97, from base to emitter of transistor 95. This current causes transistor 95 to be conductive when the value of current $I_7$ decreases and causes the voltage at the collector of transistor 94 to be near ground potential until capacitor 91 starts to discharge. Transistor 90 provides a discharge path for capacitor 91 when transistor 90 is conductive and prevents discharge of the capacitor when the transistor 90 is nonconductive. When a positive voltage is applied to the base of transistor 90, transistor 90 is rendered conductive. Current $I_7$ causes a voltage across capacitor 91 to increase until the voltage at the emitter of unijunction transistor 88 is greater than the peak point voltage. If transistor 90 is conductive the peak point voltage at the emitter of unijunction transistor 85 causes a current $I_8$ to flow from the upper plate of capacitor 91 through emitter to base-one of transistor 85, from collector to emitter of transistor 90, through diode 93 and resistor 92 to the lower plate of capacitor 91 thereby discharging capacitor 91. Current $I_8$ through diode 93 develops a negative voltage at the cathode of diode 93 so that a negative voltage is applied to the base of transistor 95, thereby rendering transistor 95 nonconductive. When transistor 95 is rendered nonconductive the voltage drop across resistor 96 decreases so that a positive pulse of voltage is developed at the collector of transistor 95. The pulses from the collector of transistor 95 are coupled to the counter and trigger generator 72 causing the counter and generator to sequentially provide trigger pulses at the output leads 127–130. These trigger pulses from the generator 72 are coupled to the silicon controlled rectifiers 38–40 of FIG. 1 and cause the silicon controlled rectifiers to be sequentially rendered conductive, thereby causing transformers 24–27 to sequentially provide electrical energy to filter capacitors 57 and 58.

The counter and trigger generator 72 includes a pair of master-slave flip-flops 108 and 109 which are commercially available from several sources. One such master-slave flip-flop which may be used is the 7473 manufactured by Fairchild and described in the booklet "Fairchild Semiconductor" by Fairchild Semiconductor Corp., Mountainview, Calif. Since the operation of the master-slave flip-flop is relatively well known in the art it is believed unnecessary to describe all the details of the operation of the master-slave flip-flop. Even though details will be eliminated a basic description of the master-slave flip-flop will be given to enable one skilled in the art to understand the environment in which the present invention is placed. Accordingly, the operation of the counter and trigger generator of FIG. 2 will be described in connection with the waveforms illustrated in FIG. 4.

Each master-slave flip-flop includes a pair of J–K flip-flops, an inverter and four AND-gates. The JK flip-flop, as the term is used in the description of this portion of the present invention, is a bistable device whose output is the function of its last input. Such a flip-flop is shown and represented by reference number 114 in FIG. 2. This flip-flop is a two-input, two-output device having set "S" and reset "R" input terminals and a Q and $\overline{Q}$ output terminals. In this type of device, a binary one applied to the set (S) terminal places the flip-flop into its set state in which condition there is a binary one at its Q output terminal and a binary zero at its $\overline{Q}$ output terminal. Conversely, a binary one applied to its reset (R) terminal places the flip-flop into the state in which there is a binary zero at its Q output terminal and a binary one at its $\overline{Q}$ output terminal. In the circuit shown in FIG. 2 a binary one is represented by a positive value of voltage and a binary zero is represented by a value of voltage near ground potential.

The AND-gates disclosed in FIG. 2 provide a logical operation of conjunction for binary one signals applied thereto. The AND-gate provides a positive output signal representing a binary one, when and only when, all of the input signals applied thereto are positive and represent binary ones. The inverters disclosed provide the logical operation of inversion for an input signal applied thereto. The inverter provides a positive output signal representing a binary one when the input signal represents a binary zero. Conversely, the inverter provides an output signal representing a binary zero when the input signal represents a binary one.

Each of the timing pulses applied to signal-input lead 73 of the counter and trigger generator 72 causes one of the master-slave flip-flops 108 and 109 to change states, thereby producing a signal pulse at one of the output leads 127–130. For example, prior to time $t_1$ of FIG. 4 the voltages $\overline{B}$ and $\overline{C}$ of flip-flops 108 and 109 are positive. At time $t_1$ a pulse on input lead 73 and the voltage from $\overline{C}$ cause AND-gate 112 to be enabled and cause flip-flop 114 to be set. When flip-flop 114 is set a positive voltage from the Q output lead is applied to one lead of AND-gate 119. When the voltage on input lead 73 drops this voltage is inverted by inverter 117 and applied to the other lead of AND-gate 119 thereby enabling gate 119 and causing flip-flop 121 to be set. When flip-flop 121 is set a positive going voltage on the B lead produces a positive pulse on output lead 127. This positive pulse on output lead 127 is coupled to the gate of silicon controlled rectifier 38 (FIG. 1) thereby rendering rectifier 38 conductive. The next timing pulse on lead 73 and the positive voltage from the B output lead of the master-slave flip-flop 108 cause AND-gate 133 in flip-flop 109 to be enabled, thereby setting flip-flop 135. When flip-flop 135 is set a positive voltage from the Q output lead is applied to one lead of AND-gate 139. When the voltage on input lead 73 decreases this voltage is inverted by inverter 137 and applied to the other lead of AND-gate 139 thereby enabling AND-gate 139 and causing flip-flop 141 to be set. When flip-flop 141 is set a positive voltage from the Q output lead is coupled through capacitor 144 to provide a positive pulse on the output lead 129. This positive pulse on output lead 129 is coupled to the gate of silicon controlled rectifier 40 (FIG. 1) thereby rendering silicon controlled rectifier 40 conductive.

At time $t_6$ the positive pulse on input lead 73 and the positive voltage from the C lead of master-slave flip-flop 109 cause AND-gate 113 to be enabled so that flip-flop 114 in the master-slave flip-flop 108 is reset.

When flip-flop 114 is reset a positive voltage from the $\overline{Q}$ output lead of flip-flop 114 is applied to one lead of AND-gate 120. When the voltage on input lead 73 decreases the signal is inverted by inverter 117 and applied to the other lead of AND-gate 120 thereby enabling gate 120 and causing the slave flip-flop 121 to be reset. When flip-flop 121 is reset a positive voltage from the $\overline{Q}$ output lead of flip-flop 121 is coupled through capacitor 125 to provide a positive pulse on output lead 128. At time $t_8$ the positive voltage from $\overline{B}$ output lead of the master-slave flip-flop 108 and the pulse on the input lead 73 enables AND-gate 134 so that the master flip-flop 135 is reset. When the voltage on input lead 73 decreases this voltage is inverted by inverter 137 and applied to gate 140 thereby causing the slave flip-flop 141 to be reset. When flip-flop 141 is reset a positive voltage from the $\overline{Q}$ output lead of flip-flop 141 is coupled through capacitor 145 to provide a positive pulse on the output lead 130.

The timer 71 provides a minimum time duration between the timing pulses on the input lead 73 of the counter and generator 72 and prevents two silicon controlled rectifiers in FIG. 1 from conducting at the same time. If two silicon controlled rectifiers were to conduct at the same time this could cause damage to the silicon controlled rectifiers of the switching regulator. The timer includes a one-shot 98 and a transistor 102. The one-shot is a circuit similar to the flip-flop differing only in that it operates in one stable state rather than two. It transfers from its reset state in which it normally operates to its set state upon the application of a trigger signal thereto. In its set state, the one-shot represents the binary one (one-state) and in the reset state, the binary zero (zero-state). The lead entering the left-hand side of the one-shot symbol shown in FIG. 2 provides the set input signal. When the set input signal goes positive, the one-shot is transferred to its one-state and stays in this set state for a predetermined period of time depending upon the time rating of the one-shot. At the end of this predetermined time the one-shot automatically returns to its stable state (i.e., its reset state). The period of time the one-shot remains in its set state can be controlled by the selection of electronic components used to build the one-shot.

In the circuit disclosed, the duration of the one-state of one-shot 98 allows the capacitors 44–47 to discharge through one of the silicon controlled rectifiers 38–41 so that the corresponding rectifier is rendered nonconductive before another rectifier is rendered conductive. A pulse supplied to the input of one-shot 98 causes a positive voltage on the output lead of the one-shot thereby causing the transistor 102 to be rendered conductive. When transistor 102 is rendered conductive the voltage on the collector of transistor 102 and on the base of transistor 90 is substantially at ground potential. When the base of transistor 90 is at ground potential transistor 90 is rendered nonconductive so that the oscillator 69 is disabled and can not generate any timing pulses.

Signals from the master-slave flip-flops 108 and 109 and from the recovery disable circuit 68 are used to aid in providing a minimum time duration between the timing pulses from the pulse amplifier. In order for a pulse to be developed at time $t_4$, for example, the voltage B must be positive which means that the flip-flop 108 must be set. The positive voltage from lead B is coupled through diode 105 and resistor 81 to the base of transistor 90 thereby rendering transistor 90 conductive so that capacitor 91 can discharge and produce the timing pulse. At time $t_6$ a positive voltage from the C output of master-slave flip-flop 109 provides a positive voltage through diode 104 and resistor 81 to the base of transistor 90. At time $t_{10}$ the positive voltage E is coupled through diode 78 and resistor 81 to the base of transistor 90. For example, at time $t_{10}$ if the transformer 24 has not recovered so that the voltage at terminal 62 is still positive a timing pulse cannot be generated. As seen in FIG. 4 prior to time $t_9$ of waveform D a positive voltage applied to terminal 62 of FIG. 2 causes a current $I_{10}$ to flow from terminal 62 through resistor 74, from base to emitter of transistor 77, thereby rendering transistor 77 conductive. When transistor 77 is rendered conductive a current $I_{11}$ flows from the +24 volt source through resistor 75, from collector to emitter of transistor 77 thereby providing a voltage drop across resistor 75. The voltage drop across resistor 75 causes the voltage at the collector of the transistor 77 to be near ground potential so that the voltage at the base of transistor 90 is near ground potential thereby rendering transistor 90 non-conductive. When transistor 90 is nonconductive capacitor 91 cannot discharge so that a timing pulse cannot be generated.

While the principles of the invention have now been made clear in an illustrative embodiment, there will be many obvious modifications of the structure, proportions, materials and components without departing from those principles. The appended claims are intended to cover any such modifications.

What is claimed is:

1. A sequencer for a dual switching regulator having a transformer having a secondary winding, said sequencer comprising:
    first and second master-slave flip-flops each having first, second and third input leads and first and second output leads, said first output lead of said first flip-flop being connected to said first input lead of said second flip-flop, said second output lead of said first flip-flop being connected to said second input lead of said second flip-flop, said first output lead of said second flip-flop being connected to said second input lead of said first flip-flop, said second output lead of said second flip-flop being connected to said first input lead of said first flip-flop;
    an oscillator having a current input lead and an output lead, said output lead of said oscillator being coupled to said third input leads of said first and said second flip-flops;
    a disabling circuit, said disabling circuit being connected to said oscillator; and
    first, second and third diodes, said first diode being coupled between disabling circuit and said secondary winding of said transformer, said second diode being connected between said disabling circuit and said first output lead of said first flip-flop, said third diode being connected between said disabling circuit and said first output lead of said second flip-flop.

2. A sequencer for a dual switching regulator as defined in claim 1 including:
    a timer having an input lead and an output lead, said output lead of said timer being connected to said oscillator disabling circuit; and
    a pulse amplifier having an input lead and an output lead, said input lead of said amplifier being connected to said output lead of said oscillator, said output lead of said amplifier being connected to said third input leads of said first and said second flip-flops, said input lead of said timer being connected to said output lead of said amplifier.

3. A sequencer for a dual switching regulator having a transformer having a secondary winding, said sequencer comprising:
    first and second master-slave flip-flops, each having first, second and third input leads and first and second output leads, said first output lead of said first flip-flop being connected to said first input lead of said second flip-flop, said second output lead of said first flip-flop being connected to said second input lead of said second flip-flop, said first output lead of said second flip-flop being connected to said second input lead of said first flip-flop, said second output lead of said second flip-flop being connected to said first input lead of said first flip-flop;
    a unijunction transistor having an emitter and first and second bases;
    a capacitor, a first plate of said capacitor being connected to said emitter of said unijunction transistor;
    a signal-input terminal, said input terminal being connected to said emitter of said unijunction transistor;
    first and second resistors;
    diode means having an anode and a cathode, said first resistor being connected between a second plate of said capacitor and the cathode of said diode means;
    first and second reference potentials, the anode of said diode means being connected to said second potential;
    a first transistor having a base, a collector and an emitter, said collector of said first transistor being connected to said first base of said unijunction transistor, said emitter of said first transistor being connected to said second potential, said second resistor being connected between said first potential and said second base of said unijunction transistor, said cathode of said diode means being coupled to said third input leads of said first and said second flip-flops, said base of said first transistor being coupled to said secondary winding of said transformer;
    a third transistor having a base, a collector and an emitter, said emitter of said third transistor being connected to said second potential, said collector of said third transistor being connected to said base of said first transistor; and
    a one-shot having an input lead and an output lead, said input lead of said one-shot being connected to said third input leads of said first and said second flip-flops, said output lead of said one-shot being coupled to said base of said transistor.

4. A sequencer for a dual switching regulator as defined in claim 3 including;
    a fourth transistor having a base, a collector and an emitter, said emitter of said fourth transistor being connected to said second potential, said base of said fourth transistor being coupled to said secondary winding of said transformer;

a fifth resistor, said fifth resistor being connected between said first potential and said collector of said fourth transistor; and first, second and third diodes, said first diode being connected between said collector of said fourth transistor and said base of said first transistor, said second diode being connected between said base of said first transistor and said first output lead of said first flip-flop, said third diode being connected between said base of said first transistor and said first output lead of said second flip-flop.

5. A sequencer for a dual switching regulator as defined in claim 3 including:

a second transistor having a base, a collector and an emitter, said emitter of said second transistor being connected to said second potential, said base of said second transistor being connected to said cathode of said diode means; and third and fourth resistors, said third resistor being connected between said base of said second transistor and said first potential, said fourth resistor being connected between said collector of said second transistor and said first potential, said collector of said second transistor being connected to said third input leads of said first and said second flip-flops said input lead of said one-shot being connected to said collector of said second transistor.

6. A sequencer for a dual switching regulator having a transformer having a secondary winding, said sequencer comprising:

first and second master-slave flip-flops, each having first, second and third input leads and first and second output leads, said first output lead of said first flip-flop being connected to said first input lead of said second flip-flop, said second output lead of said first flip-flop being connected to said second input lead of said second flip-flip, said first output lead of said second flip-flop being connected to said second input lead of said first flip-flop, said second output lead of said second flip-flop being connected to said first input lead of said first flip-flop;

a unijunction transistor having an emitter and first and second bases;

a capacitor, a first plate of said capacitor being connected to said emitter of said unijunction transistor;

a signal-input terminal, said input terminal being connected to said emitter of said unijunction transistor;

first and second resistors;

diode means having an anode and a cathode, said first resistor being connected between a second plate of said capacitor and the cathode of said diode means;

first and second reference potentials, the anode of said diode means being connected to said second potential;

a first transistor having a base, a collector and an emitter, said collector of said first transistor being connected to said first base of said unijunction transistor, said emitter of said first transistor being connected to said second potential, said second resistor being connected between said first potential and said second base of said unijunction transistor, said cathode of said diode means being coupled to said third input leads of said first and said second flip-flops;

a fourth transistor having a base, a collector and an emitter, said emitter of said fourth transistor being connected to said second potential, said base of said fourth transistor being coupled to said secondary winding of said transformer;

a fifth resistor, said fifth resistor being connected between said first potential and said collector of said fourth transistor; and first, second and third diodes, said first diode being connected between said collector of said fourth transistor and said base of said first transistor, said second diode being connected between said base of said first transistor and said first output lead of said first flip-flop, said third diode being connected between said base of said first transistor and said first output lead of said second flip-flop.

7. A sequencer for a dual switching regulator as defined in claim 6 including:

a second transistor having a base, a collector and an emitter, said emitter of said second transistor being connected to said second potential, said base of said second transistor being connected to said cathode of said diode means; and third and fourth resistors, said third resistor being connected between said base of said second transistor and said first potential, said fourth resistor being connected between said collector of said second transistor and said first potential, said collector of said second transistor being connected to said third input leads of said first and said second flip-flops.

8. A sequencer for a dual switching regulator as defined in claim 6 including:

second and third transistors each having a base, a collector and an emitter, said emitters of said second and said third transistors each being connected to said second potential, said base of said second transistor being connected to said cathode of said diode means, said collector of said third transistor being connected to said base of said first transistor;

third and fourth resistors, said third resistor being connected between said first potential and said base of said second transistor, said fourth resistor being connected between said first potential and said collector of said second transistor, said collector of said second transistor being connected to said third input leads of said first and said second flip-flops; and a one-shot having an input lead and an output lead, said input lead of said one-shot being connected to said collector of said second transistor, said output lead of said one-shot being coupled to said base of said third transistor.

* * * * *